US012791065B2

(12) United States Patent
Eryilmaz et al.

(10) Patent No.: US 12,791,065 B2
(45) Date of Patent: Nov. 10, 2026

(54) CONSTANT-VELOCITY SLIP BALL JOINT

(71) Applicants: GKN Driveline Deutschland GmbH, Offenbach am Main (DE); GKN Driveline International GmbH, Lohmar (DE)

(72) Inventors: Orkan Eryilmaz, Lohmar (DE); Benjamin Panhirsch, Offenbach (DE)

(73) Assignees: GKN Driveline Deutschland Gmbh, Offenbach am Main (DE); GKN Driveline International GmbH, Lohmar (DE)

( * ) Notice: Subject to any disclaimer, the term of this patent is extended or adjusted under 35 U.S.C. 154(b) by 237 days.

(21) Appl. No.: 18/708,641

(22) PCT Filed: Feb. 17, 2022

(86) PCT No.: PCT/EP2022/053979
§ 371 (c)(1),
(2) Date: May 9, 2024

(87) PCT Pub. No.: WO2023/155993
PCT Pub. Date: Aug. 24, 2023

(65) Prior Publication Data
US 2025/0003455 A1 Jan. 2, 2025

(51) Int. Cl.
*F16D 3/227* (2006.01)
*F16D 3/223* (2011.01)

(52) U.S. Cl.
CPC .... *F16D 3/227* (2013.01); *F16D 2003/22306* (2013.01); *F16D 2003/22309* (2013.01); *Y10S 464/906* (2013.01)

(58) Field of Classification Search
CPC ..................... F16D 3/223; F16D 3/227; F16D 2003/22306; F16D 2003/22309; Y10S 464/906
(Continued)

(56) References Cited

U.S. PATENT DOCUMENTS 2,321,448 A * 6/1943 Anderson ............... F16D 3/223 464/144
3,133,431 A * 5/1964 Zech ....................... F16D 3/223 464/145
(Continued)

FOREIGN PATENT DOCUMENTS

DE 19958147 A1 6/2001
DE 10103550 A1 8/2002
(Continued)

OTHER PUBLICATIONS

International Search Report and Written Opinion for PCT/EP2022/053979 mailed Oct. 12, 2022 (11 pages; with English machine translation).
(Continued)

*Primary Examiner* — Josh Skroupa
(74) *Attorney, Agent, or Firm* — Reising Ethington P.C.

(57) ABSTRACT

A ball constant velocity sliding joint comprises at least an outer joint part with a first axis of rotation extending along an axial direction and with outer ball tracks and outer center lines, a joint inner part with inner ball tracks and inner center lines, a plurality of torque-transmitting balls, which are each guided in outer ball tracks and inner ball tracks assigned to one another and forming track pairs; and a cage which is provided with a plurality of cage windows, each of which receives one or more of the balls; wherein the center lines extend along the ball tracks from a first end region along the axial direction to a second end region; wherein the center lines of each track pair each extend at an inclination angle, that is inclined relative to the axial direction in a radial direction, and at a helix angle, that is inclined relative to the axial direction in a circumferential direction, and each extend in opposite directions.

12 Claims, 4 Drawing Sheets

(58) Field of Classification Search
USPC ......................... 464/143, 144, 145, 146, 906
See application file for complete search history.

(56) References Cited

U.S. PATENT DOCUMENTS

| | | | | |
|---|---|---|---|---|
| 3,475,924 | A * | 11/1969 | Aucktor .................. | F16D 3/223 464/145 |
| 5,222,914 | A * | 6/1993 | Mazziotti ................ | F16D 3/227 464/145 |
| 6,270,419 | B1 * | 8/2001 | Jacob .................... | F16D 3/2237 464/145 |
| 6,913,540 | B2 * | 7/2005 | Iihara ...................... | F16D 3/223 464/146 |
| 7,806,772 | B2 * | 10/2010 | Frost ....................... | F16D 3/223 464/144 |
| 2008/0085776 | A1 | 4/2008 | Frost et al. | |
| 2021/0140489 | A1 * | 5/2021 | Saito ....................... | F16D 3/223 |

FOREIGN PATENT DOCUMENTS

| | | | | |
|---|---|---|---|---|
| DE | 102007010352 | A1 | 4/2008 | |
| DE | 102008008212 | A1 | 8/2009 | |
| DE | 102012005129 | A1 * | 9/2013 | ............. F16D 3/227 |
| JP | H04151020 | A | 5/1992 | |
| JP | 2021148223 | A | 9/2021 | |
| WO | WO2019026596 | A1 | 2/2019 | |

OTHER PUBLICATIONS

Japanese Office Action for Japanese Application No. JP2024-547752 dated Jul. 29, 2025 (11 pages).

* cited by examiner

CONSTANT-VELOCITY SLIP BALL JOINT

CROSS-REFERENCE TO RELATED APPLICATIONS

This application is a national stage of, and claims priority to, Patent Cooperation Treaty Application No. PCT/EP2022/053979, filed on Feb. 17, 2022, which application is hereby incorporated herein by reference in its entirety.

BACKGROUND

With ball constant velocity sliding joints, the inner parts of the joint can move relative to the outer parts of the joint in the axial direction. The total displacement (i.e. the maximum distance by which the inner part of the joint can be displaced relative to the outer part of the joint) is at least five millimeters in a sliding joint.

At least a part of the outer ball tracks and at least a part of the inner ball tracks can have an (arbitrarily oriented) inclination angle (that is inclined with respect to a radial direction) and/or a (arbitrarily oriented) helix angle (that is. inclined with respect to a circumferential direction) with respect to the axis of rotation or can also run without a track inclination angle, that is parallel to the axial direction or axis of rotation. If the joint is in an extended position or arrangement (that is the inner joint part is not articulated relative to the outer joint part), the inner joint part can be displaced relative to the outer joint part along the common axis of rotation in a ball constant velocity sliding joint so that the axes of rotation remain coaxial with each other. Displacement is also possible when the joint is articulated.

For example, a ball track base (that is in the case of the outer ball tracks, the areas of the ball tracks that are arranged at the greatest distance from the axis of rotation; in the case of the inner ball tracks, the areas of the ball tracks that are arranged at the smallest distance from an axis of rotation of the inner part of the joint) or a center line (the course of a ball center point during the movement of a ball along a ball track) of each ball track along the displacement path has a (substantially) constant distance from the axis of rotation along a radial direction (if the inclination angle is zero degrees). However, there are also known designs of ball constant velocity sliding joints in which the ball track base or the center line do not have a constant distance from the axis of rotation (if the inclination angle is not equal to zero angular degrees). For example, the distance to the axis of rotation is the same (only) for opposing ball tracks, but is not constant over the displacement movement or along the ball track.

When the inner joint part is displaced relative to the outer joint part, the balls in the ball tracks perform a movement guided by the track (that is rolling, sliding, gliding, etc.). Ideally, the cage moves by half the distance of the displacement of the inner joint part relative to the outer joint part. There is no relative rotation of the inner joint part, outer joint part and cage in the circumferential direction. The inclination of the ball tracks in relation to the axial direction therefore requires that the cage has sufficiently wide cage windows so that the balls can perform the displacement along the circumferential direction when the joint parts are relatively displaced along the axial direction.

When the inner joint part is articulated, the inner joint part is pivoted from the extended position (first axis of rotation of the outer joint part and second axis of rotation of the inner joint part are arranged coaxially to each other) into a (deviating) articulated position. The first axis of rotation of the outer part of the joint and the second axis of rotation of the inner part of the joint then form an angle of articulation (deviating from zero degrees).

A ball constant velocity sliding joint can include at least one outer joint part with a first axis of rotation extending along an axial direction and with outer ball tracks and with outer center lines, an inner joint part with inner ball tracks and inner center lines, a plurality of torque-transmitting balls which are each guided in outer ball tracks and inner ball tracks assigned to one another and forming track pairs; and a cage provided with a plurality of cage windows which each accommodate one or more of the balls. The center lines extend along the ball tracks from a first end region (of the joint or the respective joint part) along the axial direction to a second end region (of the joint or the respective joint part). The center lines of each pair of tracks each run at an inclination angle, that is inclined with respect to a radial direction, and at a helix angle, that is inclined with respect to a circumferential direction, and in each case in opposite directions.

A joint of this type is known from DE 10 2007 010 352 A1. There, the ratio between the helix angle and the inclination angle is 5:3.

Known ball constant velocity sliding joints can generate noise (click noise) at high angles of articulation. The cause of this noise is the change in the contact points of the balls in the respective cage window. This effect can be amplified by a combination of increased clearance (large clearance fit) between the window and the balls in the ball cage.

It is known to counteract this problem, that is the noise that occurs, by reducing the clearance between the window and the ball. The fit between the cage window and the ball can therefore also be designed as a nominal fit or as a transitional fit. However, a more precise fit leads to disadvantages in terms of the efficiency and service life of the ball constant velocity sliding joint.

There is a constant need to improve ball constant velocity sliding joints.

SUMMARY

The present disclosure relates to a ball constant velocity sliding joint (hereinafter also referred to as a joint), which can be installed in side shaft arrangements or longitudinal shaft arrangements in motor vehicles. The ball constant velocity sliding joint can be used in floating joint shaft arrangements in which a ball constant velocity sliding joint is arranged at each end of a torque-transmitting shaft. Such joint shaft arrangements can be used in rear-wheel drive motor vehicles in the area of the rear axle. With the present ball constant velocity sliding joint the noise occurring during operation can be minimized or can occur less frequently, but restrictions with regard to the efficiency or the service life should not occur as far as possible.

A ball constant velocity sliding joint with the features according to claim 1 contributes to solving these tasks. Advantageous further developments are the subject of the dependent claims. The features listed individually in the claims can be combined with each other in a technologically meaningful way and can be supplemented by explanatory facts from the description and/or details from the figures, whereby further embodiments are shown.

A ball constant velocity sliding joint is proposed, comprising at least

- an outer joint part with a first axis of rotation extending along an axial direction and with outer ball tracks and outer center lines,

- an inner joint part with inner ball tracks and inner center lines, and For example a second axis of rotation;
- a plurality of torque-transmitting balls, which are each guided in associated outer ball tracks and inner ball tracks forming track pairs; and
- a cage provided with a plurality of cage windows each receiving one or more of the balls.

The center lines of each pair of tracks each extend at an inclination angle, that is inclined in a radial direction relative to the axial direction (or the respective axis of rotation) and at a helix angle, that is inclined in a circumferential direction relative to the axial direction (or the respective axis of rotation), and each extend in opposite directions.

In the case of the constant velocity ball bearing sliding joint

- the inclination angles each have an absolute value of (more than zero angular degrees and) at most four angular degrees and the helix angles each have an absolute value of at least nine angular degrees; or
- the inclination angles each have an absolute value of at least nine angular degrees and the helix angles each have an absolute value of (more than zero angular degrees and) at most four angular degrees.

The center line (the course of a ball center point when a ball moves along a ball track) of each ball track extends along the axis of rotation of each joint part or along the axial direction from a first end portion (where the ball track starts) to a second end portion (where the ball track ends).

The ball tracks or center lines distributed along the circumferential direction can also be represented in an unwound state, that is not in a spatial, but in a two-dimensional planar image. In this case, the ball tracks or center lines, which are inclined at the inclination angle, are projected onto the flat image. For example, the center lines run in a straight line in that case.

For example, the ball tracks run at a (constant) inclination angle (also referred to as pitch angle), that is inclined in a radial direction relative to the axial direction (or relative to the first axis of rotation in the case of the outer center lines and relative to the second axis of rotation in the case of the inner center lines). At the same time, the ball tracks run at a (constant) helix angle (also referred to as track helix angle), that is inclined in a circumferential direction relative to the axial direction (or relative to the first axis of rotation in the case of the outer center lines and relative to the second axis of rotation in the case of the inner center lines).

The ball tracks of a track pair run in opposite directions, that is both the inclination angle and the helix angle of the respective outer center line run in opposite directions to the inclination angle and the helix angle of the respective inner center line.

For example, the absolute values of the inclination angles are the same for all ball tracks.

For example, the absolute values of the helix angles are the same for all ball tracks.

It has been found that a significant reduction in the noise that would otherwise occur can be achieved for the claimed intervals of the inclination angles and helix angles. For example, it is possible to ensure that the balls do not leave their contact surface on one side of the cage window at all and therefore remain in permanent contact with it. A change to the other contact surface of the cage window then occurs less frequently or even not at all. For example, a change of the contact surface can be prevented during stationary operation of an operating mode of a motor vehicle, e.g. forward travel. However, a change in the contact surface can then still occur, e.g. when the direction of rotation is reversed after the vehicle has come to a standstill, but is then unproblematic.

By considering various boundary conditions (speed of the ball constant velocity sliding joint, torque transmitted via the ball constant velocity sliding joint, direction of drive, angle of articulation of the ball constant velocity sliding joint, cage window clearance, etc.), it was possible to identify angular values for the inclination angles and helix angles at which the problem described above is solved over the continuous operating range. By simulating the positions of the rolling elements (balls) in the cage window via a rotation, it was possible to determine the correlation that the noise characteristics of the ball constant velocity sliding joint are significantly improved for a certain combination of inclination angle and helix angle.

For example, this finding relates to the ball constant velocity sliding joints described, whereby the inclination angles and helix angles are constant over the course of the ball tracks.

The aforementioned combination of inclination angle and helix angle can be used For example for constant velocity ball joints in which the cage can lose its contact with the outer joint part and/or the inner joint part during operation for joint-kinematic reasons and thus cause noise (e.g. in a countertrack joint).

For example, the cage has a respective web along a circumferential direction between the cage windows, which is guided in a known manner via a respective spherical contact surface on the outer joint part and/or on the inner joint part.

In the case of a floating side shaft, for example, the webs are spherical both on the outer diameter and on the inner diameter, so that a spherical inner joint part can form a stop relative to the axial direction. In a so-called long-plunge joint, only the outer diameter is spherical, for example, as these joints are installed together with a fixed joint and therefore no stop (i.e., contact between the spheres of the cage and the inner part of the joint) is necessary.

For example, the center lines are straight, that is the inclination angle and the helix angle have constant absolute values along the course of the ball track.

For example, the ball constant velocity sliding joint has 8+2n balls, with n=0, 1, 2, . . . ; that is eight, ten or twelve balls, etc.

For example, the outer ball tracks arranged adjacent to one another in the circumferential direction and the inner ball tracks arranged adjacent to one another in the circumferential direction are each inclined in different directions, i.e., each have opposing inclination angles and helix angles.

For example, the inclination angles have an absolute value of more than zero angular degrees and at most four (4) angular degrees, e.g., at most two (2) angular degrees, e.g., at most one (1) angular degree. For example, the helix angles have an absolute value of less than 20 angular degrees and at least nine (9) angular degrees, e.g., at least ten (10), e.g., at least 11.5 angular degrees.

Alternatively, the inclination angles have an absolute value of less than 20 angular degrees and at least nine (9) angular degrees, e.g., at least ten (10), e.g., at least 11.5 angular degrees. For example, the helix angles have an absolute value of more than zero angular degrees and at most four (4) angular degrees, e.g., at most two (2) angular degrees, e.g., at most one (1) angular degree.

When designing the ball constant velocity sliding joint, it should be noted that a larger inclination angle causes a (significant) increase in the radial installation space of the ball constant velocity sliding joint and a (significant) restriction of the sliding capacity in the given installation space. It should also be noted that a larger helix angle causes only a slight increase in the radial installation space and a smaller restriction of the displacement capacity in the given installation space.

It is therefore preferable for the inclination angle to be smaller and the helix angle to be larger.

For example, if the inclination angles each have an absolute value of at most four angular degrees, the absolute value of the helix angles is at most eighteen angular degrees, e.g., at most 16 angular degrees, e.g., at most 14 angular degrees or even at most 12.5 angular degrees. For example, the helix angle has an absolute value of at most ten angular degrees, e.g., less than 9.5 angular degrees.

For example (that is if the inclination angles each have an absolute value of at most four angular degrees), the absolute value of the inclination angles is at most two (2) angular degrees, e.g., at most one (1) angular degree or even between 0.2 and 0.8 angular degrees.

According to an example embodiment, the ball constant velocity sliding joint has an inclination angle of 0.5 angular degrees (tolerance less than 10%) and a helix angle of 12 angular degrees (tolerance less than 5%).

For example, the inclination angle is determined as a function of a maximum angle of articulation occurring during the specified operation of the ball constant velocity sliding joint. If the maximum angle of articulation is less than 12 angular degrees, the inclination angle is 0.5 angular degrees (tolerance less than 20%). If the maximum angle of articulation is more than 12 angular degrees (and e.g. less than 24 angular degrees), the inclination angle is one (1) angular degree (tolerance less than 20%).

For example, the balls contact the respective ball track at two contact points, which are each arranged in a cross-section transverse to a direction of the respective center line at a contact angle to a ball track base, wherein the contact angles are between 38 and 44 angular degrees, for example in a range of 40 to 42 angular degrees.

For example, first contact angles of the outer ball tracks and second contact angles of the inner contact tracks differ from each other by an absolute value of at least one (1) angular degree, e.g., by an absolute value of two (2) angular degrees (tolerance less than 20%).

For example, the inner joint part is displaceable relative to the outer joint part in the axial direction by at least five millimeters, e.g., by at least ten or even at least 20 millimeters.

Furthermore, a motor vehicle is proposed which has at least one ball constant velocity sliding joint as proposed here. For example, the ball constant velocity sliding joint could be used in a passenger car.

A motor vehicle with a drive unit and wheels is also proposed, wherein at least one ball constant velocity sliding joint such as the ball constant velocity sliding joint described is designed to transmit torques from the drive unit to the wheels.

The explanations relating to the constant velocity ball joint are applicable to the motor vehicle and vice versa.

The use of indefinite articles ("an", "a") for example in the claims and the description reproducing them, is to be understood as such and not as a number word. Accordingly, terms or components introduced thereby are to be understood as being present at least once and, For example, as being present more than once.

For the avoidance of doubt, it should be noted that the number words used here ("first", "second", . . . ) are primarily (only) used to distinguish between several similar objects, quantities or processes, i.e. For example they do not necessarily specify any dependency and/or sequence of these objects, quantities or processes in relation to one another. If a dependency and/or sequence is required, this is explicitly stated here or is obvious to the person skilled in the art when studying the specific embodiment described. Insofar as a component may occur more than once ("at least one"), the description of one of these components may apply equally to all or some of the plurality of these components, but this is not mandatory.

BRIEF SUMMARY OF THE DRAWINGS

The invention and the technical context are explained in more detail below with reference to the accompanying figures. It should be noted that the invention is not intended to be limited by the embodiments given. For example, unless explicitly shown otherwise, it is also possible to extract partial aspects of the facts explained in the figures and to combine them with other components and findings from the present description. For example, it should be noted that the figures and especially the proportions shown are only schematic. The figures show.

DESCRIPTION

Figure 1:
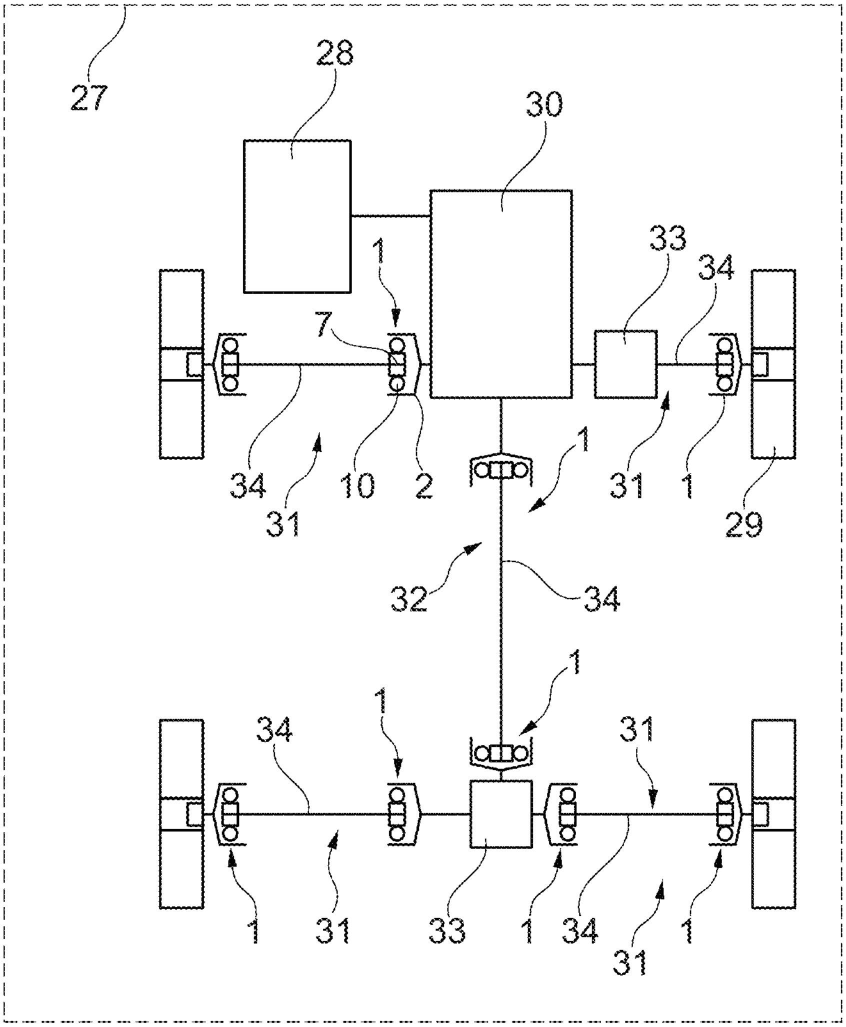
FIG. 1: a motor vehicle in a plan view.

FIG. 1 shows a schematic top view of a motor vehicle 27. The motor vehicle 27 comprises a drive unit 28 (engine) and a gearbox 30. Torques are transmitted from the drive unit 28 via the gearbox 30 to several joint arrangements 31, 32. Two side shaft arrangements 31 are shown in the area of the front axle (here at the top of the picture). One side shaft arrangement 31 (on the right in FIG. 1) is connected to the gearbox 30 via a differential 33.

Starting from the gearbox 30, a torque is transmitted via the differential 33 or via the ball constant velocity sliding joint 1 of the other side shaft arrangement 31 (left in FIG. 1) with outer joint part 2, balls 10 and inner joint part 7 to a respective shaft 34 and from there to another ball constant velocity sliding joint 1 or to a constant velocity (fixed) joint that is connected to a wheel 29.

Furthermore, a torque can alternatively or additionally be transmitted from the gearbox 30 to a longitudinal shaft arrangement 32 via a ball constant velocity sliding joint 1. The torque is transmitted to a (rear axle) differential 33 via this longitudinal shaft arrangement 32. The torque is transmitted to a respective side shaft arrangement 31 via the (rear axle) differential 33. The side shaft arrangements 31 each comprise two ball constant velocity joints 1, which are connected to each other by shafts 34.

Figure 2:
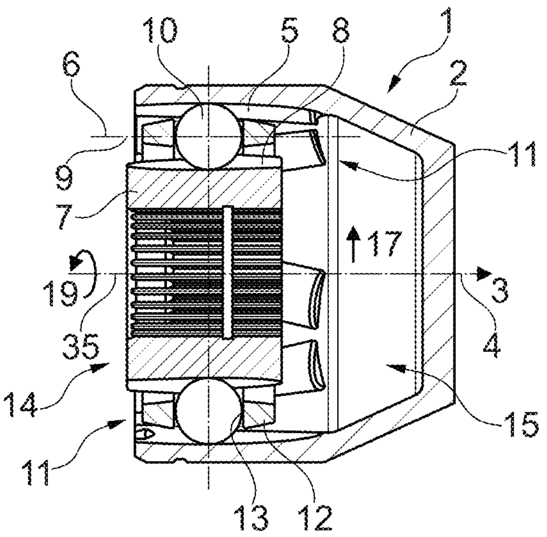
FIG. 2: a side view of a ball constant velocity joint in section, in an extended arrangement.
Figure 3:
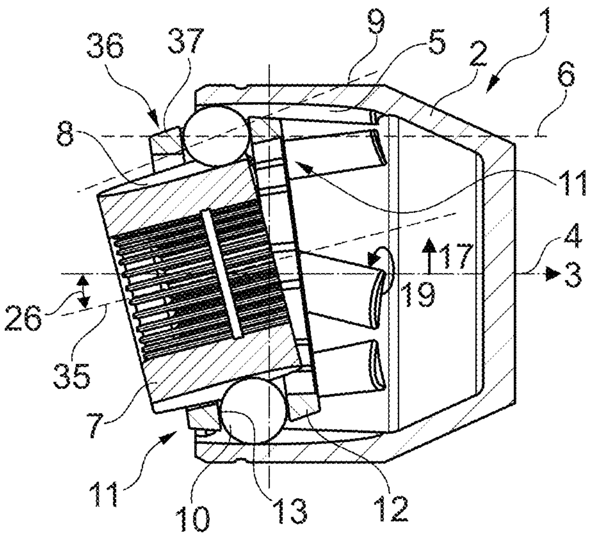
FIG. 3: the ball constant velocity sliding joint according to FIG. 2, in an articulated arrangement, in a side view in section.
Figure 4:
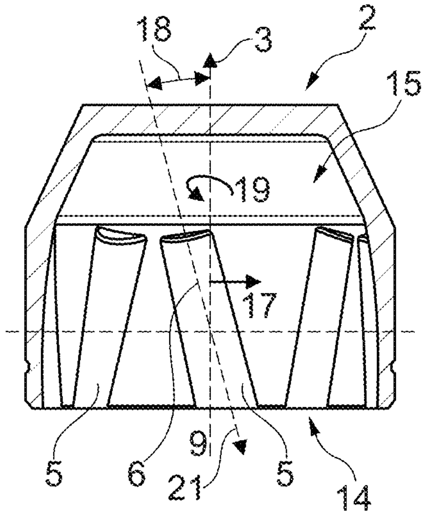
FIG. 4: the outer joint part of the ball constant velocity sliding joint according to FIGS. 1 and 2 in a side view in section.
Figure 6:
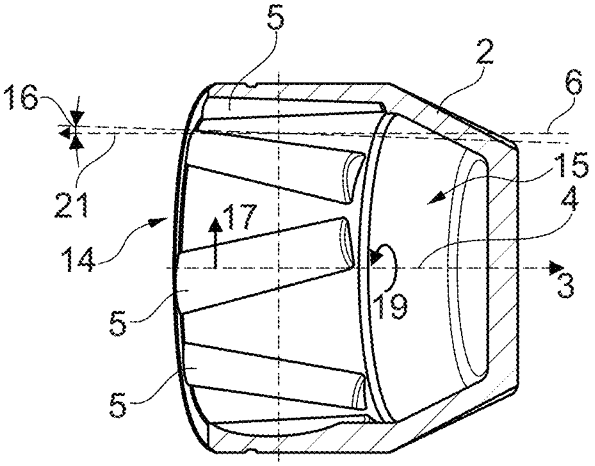
FIG. 6: the outer joint part according to FIG. 4 in a sectional perspective view.
Figure 5:
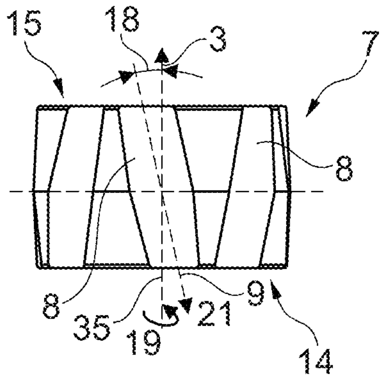
FIG. 5: the inner joint part of the ball constant velocity sliding joint according to FIGS. 1 and 2 in a side view.
Figure 7:
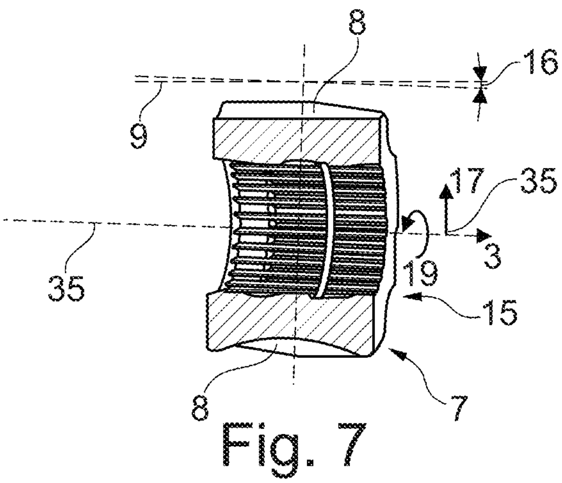
FIG. 7: the inner joint part according to FIG. 5 in a sectional perspective view.
Figure 8:
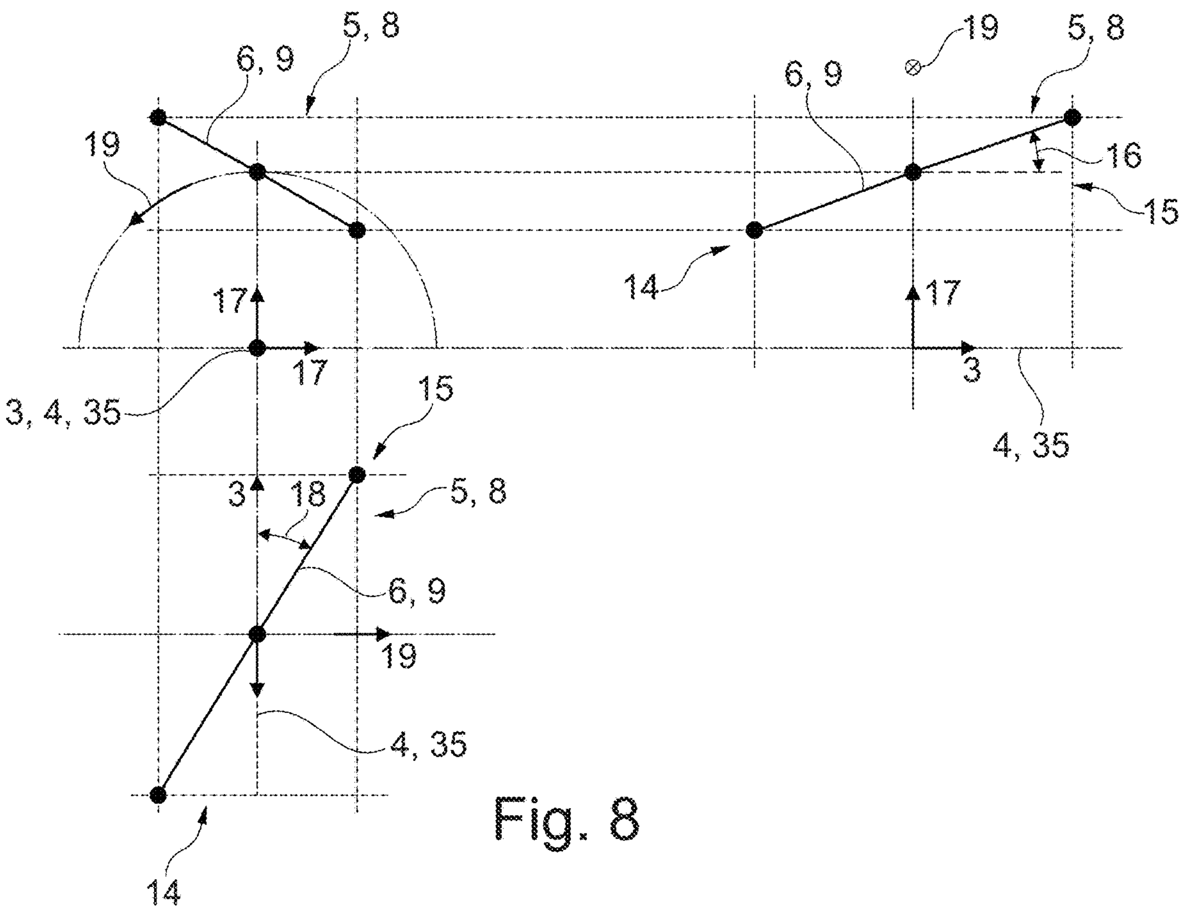
FIG. 8: a schematic representation of an inclination angle and a helix angle of a ball track.

FIG. 2 shows a side view of a ball constant velocity sliding joint 1 in section, in an extended arrangement. FIG. 3 shows the ball constant velocity sliding joint 1 according to FIG. 2, in an articulated arrangement, in a side view in section. FIG. 4 shows the outer joint part 2 of the ball constant velocity sliding joint 1 according to FIGS. 1 and 2 in a side view in section. FIG. 5 shows the inner joint part 7 of the ball constant velocity sliding joint 1 according to FIGS. 1 and 2 in a side view. FIG. 6 shows the outer joint part 2 according to FIG. 4 in a sectional perspective view. FIG. 7 shows the inner joint part 7 according to FIG. 5 in a perspective view in section. FIG. 8 shows a schematic representation of an inclination angle 16 and a helix angle 18 of a ball track 5, 8. FIGS. 2 to 8 are described together below.

The ball constant velocity sliding joint 1 comprises an outer joint part 2 with a first axis of rotation 4 extending along an axial direction 3 and with outer ball tracks 5 and outer center lines 6, an inner joint part 7 with inner ball tracks 8 and inner center lines 9 as well as a second axis of rotation 35; a plurality of torque-transmitting balls 10, each of which is guided in an associated outer ball track 5 and inner ball track 8 forming track pairs 11; and a cage 12, which is provided with a plurality of cage windows 13, each of which receives one or more of the balls 10.

The inner joint part 7 is displaceable relative to the outer joint part 2 in the axial direction 3.

FIG. 2 shows the extended arrangement of the ball constant velocity sliding joint 1, that is with coaxial arrangement of the first axis of rotation 4 and the second axis of rotation 35. FIG. 3 shows the articulated arrangement, that is the inner joint part 7 and thus the second axis of rotation 35 is pivoted relative to the outer joint part 2 and thus the first axis of rotation 35 by the angle of articulation 26.

The cage 12 has a web 36 along the circumferential direction 19 between the cage windows 13, which is guided in a known manner via a spherical contact surface 37 on the outer joint part 2. The web 36 is not shown in the sectional views of FIGS. 2 and 3, but only indicated, as it lies behind the balls 10 along the circumferential direction 19.

The ball constant velocity sliding joint 1 has eight balls 10.

The center lines 6, 9 of each pair of tracks 11 each extend at a tilt angle 16, i.e. inclined relative to the axial direction 3 (or the respective axis of rotation 4, 35) in a radial direction 17 and at a helix angle 18, i.e., inclined relative to the axial direction 3 (or the respective axis of rotation 4, 35) in a circumferential direction 19, and each run in opposite directions.

The ball constant velocity sliding joint 1 has an inclination angle 16 of 0.5 degrees and a helix angle 18 of 12 degrees.

The center line 6, 9 (the course of a ball center point during the movement of a ball 10 along a ball track 5, 8) of each ball track 5, 8 extends along the axis of rotation 4, 35 of each joint part 2, 7 or along the axial direction 3, starting from a first end region 14 (in which the ball track 5, 8 begins) to a second end region 15 (in which the ball track 5, 8 ends).

The ball tracks 5, 8 or center lines 6, 9 distributed along the circumferential direction 19 can also be represented in an unwound state, that is not in a spatial but in a two-dimensional planar image (see FIG. 8). In this case, the ball tracks 5, 8 or center lines, which are inclined at the inclination angle 16, are projected onto the flat image. The center lines 6, 9 with constant inclination angle 16 or constant helix angle 18 have a rectilinear course, that is the inclination angle 16 and the helix angle 18 each have constant absolute values along the course of the ball track 5, 8.

The outer ball tracks 5 arranged adjacent to each other in the circumferential direction 19 and the inner ball tracks 8 arranged adjacent to each other in the circumferential direction 19 are each inclined in different directions, that is, they each have opposing inclination angles 16 and helix angles 18.

In FIG. 8, the upper left-hand illustration shows a ball track 5, 8 in a view along the axial direction 3 or along the respective axis of rotation 4, 35 of the articulated part 2, 7. The center line 6, 9 runs inclined with respect to the axial direction 3. The upper right-hand illustration shows the course of the ball track 5, 8 or the center line 6, 9 in a side view of the articulated part 2, 7. Here, the center line 6, 9 runs in the plane of the illustration. The center line 6, 9 is inclined relative to the axial direction 3 by the inclination angle 16. The lower left illustration shows the course of the ball track 5, 8 or the center line 6, 9 in a plan view or in an unwound state, that is in a two-dimensional planar illustration. The center line 6, 9 is inclined relative to the axial direction 3 by the helix angle 18.

On the one hand, the ball tracks 5, 8 run at a constant inclination angle 16 (also referred to as pitch angle), that is inclined relative to the axial direction 3 (or relative to the first axis of rotation 4 in the case of the outer center lines 6 and relative to the second axis of rotation 35 in the case of the inner center lines 9) in a radial direction 17. At the same time, the ball tracks 5, 8 run at a constant helix angle 18 (also referred to as track helix angle), that is inclined in a circumferential direction 19 relative to the axial direction 3 (or relative to the first axis of rotation 4 in the case of the outer center lines 6 and relative to the second axis of rotation 35 in the case of the inner center lines 9).

The ball tracks 5, 8 of a track pair 11 each run in opposite directions, that is both the inclination angle 16 and the helix angle 18 of the respective outer center line 6 run in opposite directions to the inclination angle 16 and the helix angle 18 of the respective inner center line 9.

In FIGS. 6 and 7, the section through the respective articulated part 2, 7 is such that the respective upper ball track 5, 8 is cut along the ball track base 25. The articulated part 2, 7 is therefore shown rotated by the helix angle 18 compared to the illustration in FIGS. 2 to 4.

Figure 9:
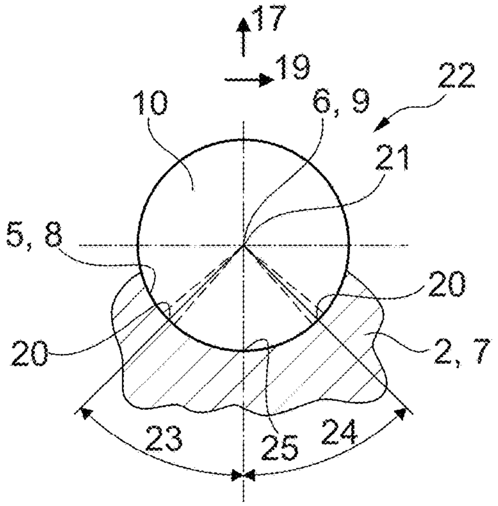
FIG. 9: a cross-section of a ball track arranged transversely to a direction of the respective center line.

FIG. 9 shows a cross-section 22 of a ball track 5, 8 arranged transversely to a direction 21 of the respective center line 6, 9. Reference is made to the explanations in FIGS. 2 to 8.

The balls 10 contact the respective ball track 5, 8 at two respective contact points 20, which are each arranged in a cross-section 22 arranged transversely to a running direction 21 of the respective center line 6, 9 at a contact angle 23, 24 to a ball track base 25. The contact angles 23, 24 are approximately 40 angular degrees, whereby, for example, the first contact angles 23 of the outer ball track 5 differ by approximately two angular degrees from the second contact angles 24 of the inner ball tracks 8.

Figure 10A:
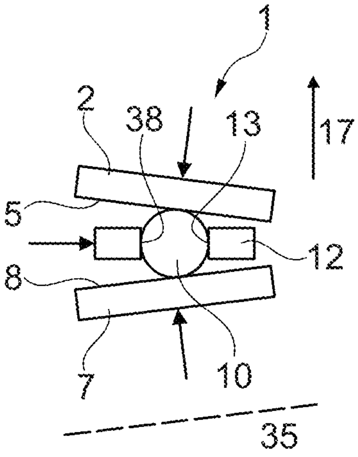
Fig. 10A Prior Art
FIGS. 10A, 10B, and 10C a schematic view of an arrangement of a ball in a known ball constant velocity sliding joint, in a side view.
Figure 10B:
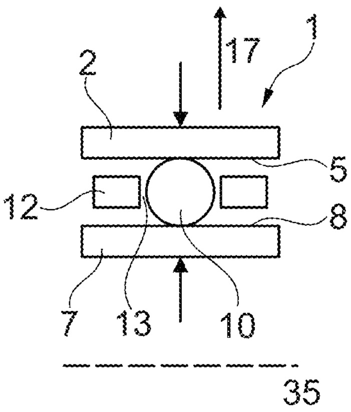
Fig. 10B Prior Art
Figure 10C:
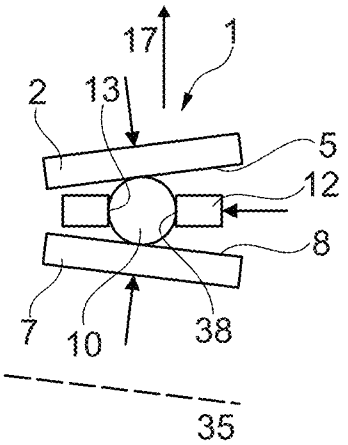
Fig. 10C Prior Art
Figure 11:
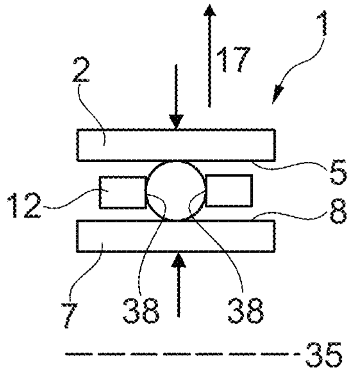
Fig. 11 Prior Art
FIG. 11: an arrangement of a ball in a known ball constant velocity sliding joint with small clearance between ball and cage window in a schematic view, in a side view.

FIG. 10 shows an arrangement of a ball 10 in a known ball constant velocity sliding joint 1 in a schematic view, in a side view. FIG. 11 shows an arrangement of a ball 10 in a known ball constant velocity sliding joint 1 with small play between ball 10 and cage window 13 in a schematic view, in a side view. FIGS. 10 and 11 are described together below. Reference is made to FIGS. 2 to 9.

The views of FIGS. 10 and 11 (and also of FIG. 12) show the balls 10 in a view along the circumferential direction 19. The second axis of rotation 35 is also indicated in each case.

The ball 10 is arranged between the outer ball track 5 and the inner ball track 8 and within a cage window 13. During operation of the ball constant velocity sliding joint 1, various boundary conditions cause the ball 10 to change the contact point 38 of the ball 10 in the respective cage window 13 or cause the ball 10 to stop, fixed by the ball tracks 5, 8, and the cage 12 to continue moving. This effect can be intensified by a combination of increased clearance (large clearance fit) between the cage window 13 and the balls 10 in the cage 12.

It is known to counteract this problem, that is the noise that occurs, by reducing the clearance between the cage window 13 and ball 10 (see FIG. 11).

Figure 12A:
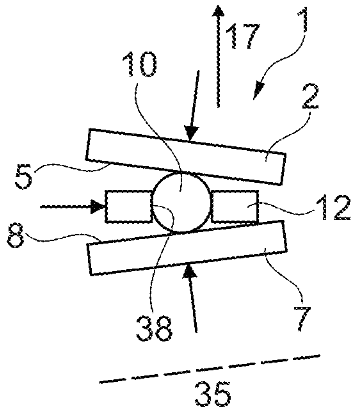
FIGS. 12A, 12B, and 12C an arrangement of a ball in a ball constant velocity sliding joint according to one of FIGS. 2 and 3 in a schematic view, in a side view.
Figure 12B:
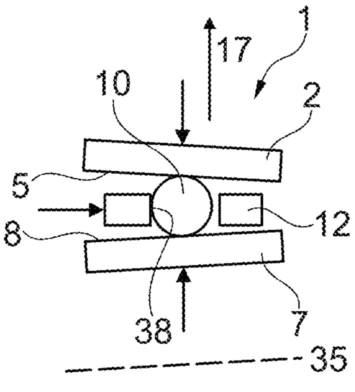
Figure 12C:
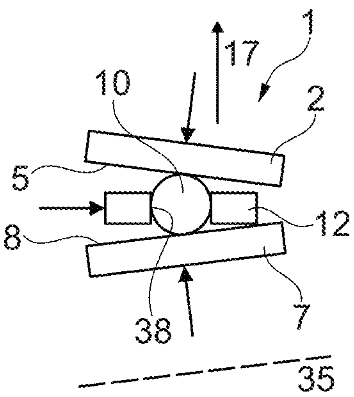

FIG. 12 shows a schematic view of an arrangement of a ball 10 in a ball constant velocity sliding joint 1 according to one of FIGS. 2 and 3, in a side view. Reference is made to the explanations in FIGS. 2 to 11.

It has been found that a significant reduction in the noise that would otherwise occur can be achieved for the ranges of inclination angle 16 and helix angle 18 proposed here. For example, it is possible to ensure that the balls 10 do not leave their contact points 38 (contact surface) on one side of the cage window 13 at all and therefore remain in permanent contact with them. A change to the other contact points 38 of the cage window 13 then occurs less frequently or even not at all.

LIST OF REFERENCE SYMBOLS

1 ball constant velocity sliding joint
2 outer joint part
3 axial direction
4 (first) axis of rotation
5 outer ball track
6 outer center line
7 inner joint part
8 inner ball track
9 inner center line
10 ball
11 track pair
12 cage
13 cage window
14 first end area
15 second end section
16 inclination angle
17 radial direction
18 helix angle
19 circumferential direction
20 contact point
21 course direction
22 cross section
23 first contact angle
24 second contact angle
25 ball track base
26 angle of articulation
27 motor vehicle
28 drive unit
29 wheel
30 gearbox
31 side shaft arrangement
32 longitudinal shaft arrangement
33 differential
34 shaft
35 second axis of rotation
36 web
37 contact surface
38 contact point

The invention claimed is:

1. A ball constant velocity sliding joint, comprising:

an outer joint part with a first axis of rotation extending along an axial direction and with outer ball tracks and outer center lines;

a joint inner part with inner ball tracks and inner center lines;

a plurality of torque-transmitting balls, which are guided in outer ball tracks and inner ball tracks assigned to one another and forming track pairs; and a cage provided with a plurality of cage windows, each of which receives one or more of the balls;

wherein the center lines extend along the ball tracks from a first end region along the axial direction to a second end region;

wherein the center lines of each track pair each extend at an inclination angle, that is inclined relative to the axial direction in a radial direction, and at a helix angle, that is inclined relative to the axial direction in a circumferential direction, and each extend in opposite directions;

wherein the inclination angles each have an absolute value of at most four degrees and the helix angles each have an absolute value of at least nine degrees, or the inclination angles each have an absolute value of at least nine degrees and the helix angles each have an absolute value of at most four degrees.

2. The ball constant velocity sliding joint of claim 1, wherein the center lines are straight.

3. The ball constant velocity sliding joint of claim 1, comprising eight, ten, or twelve balls.

4. The ball constant velocity sliding joint of claim 1, wherein in the circumferential direction adjacent outer ball tracks and adjacent inner ball tracks are each inclined in different directions, that is each have opposite inclination angles and helix angles.

5. The ball constant velocity sliding joint of claim 1, wherein, if the inclination angles each have an absolute value of at most four angular degrees, the absolute value of the helix angles is at most eighteen angular degrees.

6. The ball constant velocity sliding joint of claim 5, wherein the absolute value of the inclination angles is at most two angular degrees in each case.

7. The ball constant velocity sliding joint of claim 1, wherein the balls contact the respective ball track at two contact points in each case, which are each arranged in a cross-section arranged transversely to a running direction of the respective center line at a contact angle to a ball track base, wherein the contact angles are between 38 and 44 degrees of angle.

8. The ball constant velocity sliding joint of claim 7, wherein first contact angles of the outer ball tracks and second contact angles of the inner contact tracks differ from each other by an absolute value of at least one degree of angle.

9. The ball constant velocity sliding joint of claim 1, wherein the joint inner part is displaceable relative to the joint outer part in the axial direction by at least five millimeters.

10. The ball constant velocity sliding joint of claim 1, wherein the inclination angles each have an absolute value of at most four degrees and the helix angles each have an absolute value of at least nine degrees.

11. The ball constant velocity sliding joint of claim 1, wherein the inclination angles each have an absolute value of at least nine degrees and the helix angles each have an absolute value of at most four degrees.

12. A motor vehicle, comprising:

a drive unit;

wheels; and a ball constant velocity sliding joint that includes an outer joint part with a first axis of rotation extending along an axial direction and with outer ball tracks and outer center lines;

a joint inner part with inner ball tracks and inner center lines;

a plurality of torque-transmitting balls, which are guided in outer ball tracks and inner ball tracks assigned to one another and forming track pairs; and a cage provided with a plurality of cage windows, each of which receives one or more of the balls;

wherein the center lines extend along the ball tracks from a first end region along the axial direction to a second end region;

wherein the center lines of each track pair each extend at an inclination angle, that is inclined relative to the axial direction in a radial direction, and at a helix angle, that is inclined relative to the axial direction in a circumferential direction, and each extend in opposite directions;

wherein the inclination angles each have an absolute value of at most four degrees of angle and the helix angles each have an absolute value of at least nine degrees of angle, or the inclination angles each have an absolute value of at least nine angular degrees and the helix angles each have an absolute value of at most four angular degrees;

wherein the ball constant velocity sliding joint is configured to transmit torque from the drive unit to the wheels.

* * * * *